United States Patent [19]
Kono

[11] Patent Number: 5,930,317
[45] Date of Patent: Jul. 27, 1999

[54] POWER RANGE MONITOR SYSTEM FOR NUCLEAR REACTOR

[75] Inventor: Shigehiro Kono, Tokyo, Japan

[73] Assignee: Kabushiki Kaisha Toshiba, Kawasaki, Japan

[21] Appl. No.: 08/938,902

[22] Filed: Sep. 26, 1997

[30] Foreign Application Priority Data

Sep. 27, 1996 [JP] Japan .................................. 8-256725

[51] Int. Cl.$^6$ .................................................. G21C 17/10
[52] U.S. Cl. ........................... 376/259; 376/246; 376/254
[58] Field of Search ........................... 376/242, 245–247, 376/254, 255, 259, 210, 211, 216, 217

[56] References Cited

U.S. PATENT DOCUMENTS

| 4,337,118 | 6/1982 | Sakurai et al. ........................... 376/210 |
| 4,975,239 | 12/1990 | O'Neil et al. ........................... 376/247 |

FOREIGN PATENT DOCUMENTS

| 1-232293 | 9/1989 | Japan . |
| 3-115996 | 5/1991 | Japan . |
| 3-245096 | 10/1991 | Japan . |
| 3-245097 | 10/1991 | Japan . |
| 7-159584 | 6/1995 | Japan . |

OTHER PUBLICATIONS

Kono, Monitoring Device for Withdrawal for Control Rod Patent Abstract of Japan, JP–01–232293, Sep., 1989.
Ito et al., Nuclear Power Plant, Derwent and Patent Abstracts of Japan, JP 03–115996, May, 1991.
Suzuki et al., Power Range Monitor for Nuclear Instrumentation System of Nuclear reactor, Derwent and Patent Abstracts of Japan, JP 03–245096, Oct., 1991.
Yamaguchi et al., Power Monitoring Device for Nuclear reactor, Derwnt and Patent Abstracts of Japan, JP 03–24097, Oct., 1991.

Primary Examiner—Daniel D. Wasil
Assistant Examiner—M. J. Lattig
Attorney, Agent, or Firm—Pillsbury Madison & Sutro

[57] ABSTRACT

A power range monitor apparatus includes a plurality of average power range monitors for calculating/monitoring local power values, average reactor power values, and core flow rate values, a plurality of rod block monitors for monitoring the average values of local power values, and a plurality of flow rate signal converters for converting the signal form of recirculation rate detection signals. The flow rate signal converters concurrently transmit recirculation rate detection signals as digital signals to the average power range monitors. The average power range monitors obtain core flow rate signals from the respective recirculation rate detection signals, use them to monitor the average reactor power, and transmit them to the rod block monitors. The rod block monitors select optimal values from average reactor power values and core flow rate signals to perform a monitoring operation.

14 Claims, 12 Drawing Sheets

POWER RANGE MONITOR SYSTEM FOR NUCLEAR REACTOR

BACKGROUND OF THE INVENTION

The present invention relates to a nuclear instrumentation monitor for monitoring the power level of a nuclear reactor by measuring an output signal from a neutron detector placed in the nuclear reactor and, more particularly, to a power range monitor system used when the reactor power is in the power operation range.

The instrumentation range of a reactor is divided into a source range, an intermediate range, and a power range. The present invention is applied to a system for monitoring the reactor power in the power range. This system can be suitably applied to a boiling water reactor.

FIG. 1 shows a conventional analog power range monitor system as such a power range monitor system. As shown in FIG. 1, operating voltages are respectively biased from high-voltage power sources 2-1 to 2-n to corresponding neutron detectors 1-1 to 1-n installed in a reactor. The detector signals output from the neutron detectors 1-1 to 1-n are input to a signal output circuits 4-1 to 4-n and an averaging circuit 5 through current•voltage converters/multiplication circuits 3-1 to 3-n. The output from the averaging circuit 5 is input to an alarm determination/output circuit 6 to be used for alarm determination processing. The output from the averaging circuit 5 is also transmitted as an averaged output from a signal output circuit 7 to an external device.

In the above analog power range monitor system, the current•voltage converters/multiplication circuits 3-1 to 3-n as negative-feedback circuits constituted by operational amplifiers are used as input circuits for detector signals. The multiplication circuit functions of these current•voltage converters/multiplication circuits 3-1 to 3-n are used for signal level conversion. The function of calculating an average is realized by the averaging circuit 5 as a negative-feedback circuit constituted by an operational amplifier. The comparison circuit 6 constituting a monitoring function is constituted by an operational amplifier. The signal output circuits 4-1 to 4-n and the signal output circuit 7 are buffer amplifiers constituted by operational amplifiers.

As described above, according to the analog conventional power range monitor system, a dedicated circuit is required to realize one processing function, and signal connection between the respective circuits is performed with electrical signals. For this reason, to perform complicated signal processing, a large circuit is required. In addition, when signals are to be exchanged between the devices, the respective devices must be electrically isolated from each other. For this purpose, an electrical signal isolation device such as an isolation amplifier is placed in each signal route.

In many boiling water reactor plants, the measured value of a core flow rate is obtained from a recirculation flow signal. In a nuclear reactor having two systems of recycle loops, recirculation flow are detected in the form of differential pressure signals, the root squares of the respective detection values are calculated, and the average value of the root squares is obtained. FIG. 2 shows an arrangement for core flow rate calculation in the analog power range monitor system. As shown in FIG. 2, detection signals representing recirculation flow values are sent from recirculation flow differential pressure transmitters (1-A-1 and 1-A-2) to (1-D-1 and 1-D-2) to corresponding average power range monitors 2-A to 2-D. The average power range monitor 2-A receives the detection signals from the recirculation flow differential pressure transmitters (1-A-1 and 1-A-2) through extraction circuits 4-A-1 and 4-A-2 to calculate the root squares of the detection signals, and calculates the average value of the root squares through an averaging circuit 5-A. To use this calculated value as a core flow rate signal for monitoring the reactor power, the two core flow rate signals output from another circuit 2-C are input to a smaller value selection circuit 6-A to select a smaller one of the core flow rate signals, and the selected signal is sent to a rod block monitor 3-A. The average power range monitor 2-B has the same arrangement as that of the average power range monitor 2-A. The average power range monitor 2-B inputs the core flow rate signal calculated by an averaging circuit 5-B and the two core flow rate signals output from another circuit 2-D to a smaller value selection circuit 6-B to select a smaller one of the core flow rate signals, and sends the selected signal to a corresponding rod block monitor 3-B.

As described above, the conventional analog power range monitor system requires extraction circuits 4-A-1 to 4-D-2 and averaging circuits 5-A to 5-D in correspondence with the number of signals to perform extraction and averaging. For this reason, to minimize the number of circuits, signals obtained upon execution of core flow rate signal calculation are connected between the monitors (2-A, 2-C, 2-E) (2-B, 2-D, 2-F).

FIG. 3 shows an arrangement for core flow rate comparison processing in the conventional analog power range monitor system. Core flow rate signals A to D obtained from the detection signals from recirculation flow differential pressure signal transmitters 1-A-1 to 1-D-2 are input to corresponding signal comparison circuits 7-A to 7-D. The signal comparison circuits 7-A to 7-D are connected to each other through signal switching circuits 8-A to 8-D to receive other core flow rate signals upon switching. The outputs from the signal comparison circuits 7-A to 7-D are input to an OR circuit 10 through signal bypass circuits 9-A to 9-D which are opened/closed upon interlocking with the signal switching circuits 8-A to 8-D. The core flow rate signals A to D after calculation are sequentially transmitted and compared in units of segments by switching/controlling the signal switching circuits 8-A to 8-D and the signal bypass circuits 9-A to 9-D.

FIG. 4 shows the arrangement of a digital power range monitor system obtained by digitization of the conventional analog power range monitor system. FIG. 4 shows only a one-system arrangement. The neutron detection signals from neutron detectors (1-A-1 to 1-A-n, 1-C-1 to 1-C-n, 1-E-1 to 1-E-n) are input to average power range monitors (20-A, 20-C, 20-E). The signals from recirculation flow differential pressure signal transmitters (2-A-1, 2-A-2, 2-C-1, 2-C-2) are also input to the average power range monitors 20-A and 20-C. The average power range monitor (20-A, 20-C, 20-E) converts the neutron detection signals into digital signals, obtains the average power of the signals by average calculation, and sends it to a rod block monitor 21 and other monitors. In addition, the average power range monitor converts differential pressure signals into digital signals, obtains a core flow rate signal by root square calculation and average calculation, and sends it to other average power range monitors 20-C and 20-E.

In such a digital power range monitor system, since a microprocessor is used for digital signal processing, complicated calculation can be easily performed, and a large number of signals can be transmitted through one transmission route by using a data transmission means. By using an optical transmission means as this transmission means, electrical isolation of the respective monitors can be easily performed in exchanging signals therebetween.

In replacing the measuring apparatus in an existing plant, a new measuring apparatus must follow the function realized by the existing apparatus in principle. When, however, the analog equipment is to be replaced with digital equipment, since they differ in their characteristics, it is difficult to realize an identical equipment arrangement. More specifically, the analog equipment is poor in complicated calculation but is designed to perform continuous calculation in terms of time because the respective circuits always operate simultaneously. A delay time in calculation is therefore a very short period of time based on a propagation delay time. According to the analog equipment, design principles associated with electrical isolation and function isolation are realized to a minimum as in a scram signal. In the remaining calculation sections, however, to simplify the circuit arrangements, calculation results are not isolated but connected to each other even between redundant devices. For example, in core flow rate signal comparison in FIG. 3, the circuit arrangement is designed to sequentially send and compare signals after calculation in units of segments, as described above.

The digital equipment can easily perform complicated calculations. However, since each calculation is realized by executing a program using the microprocessor, each calculation is executed once for every execution cycle of the program, resulting in discrete processing in terms of time. A calculation delay time is therefore produced. The power range monitor system, in particular, has the function of instantaneously detecting an abnormal rise in reactor power, which is associated with the safety of the reactor, and outputting a scram signal for emergency shutdown of the reactor. The digital equipment must preferentially process this scram signal. In addition, since signal connection between the devices in the digital equipment is performed by data transmission, a large number of signals can be transmitted/received through one transmission means. The equipment arrangement can therefore be simplified. There is, however, a delay time accompanying data transmission.

As described above, when the conventional analog power range monitor system is to be replaced with a digital power range monitor system, some counter-measures are required against a signal processing delay in the digital equipment. Although advanced calculation functions and simplification of equipment arrangement can be realized, since the functions are realized in an intensive form, one device failure may greatly affect the system. For this reason, the influence ranges of such failures must be limited to prevent any problem in terms of system function.

It is an object of the present invention to provide a power range monitor system which can reduce the influences of a delay time due to digital signal processing and a delay time due to data transmission, detect a failure, and prevent a single failure from affecting the overall system, thereby improving the reliability of the system.

BRIEF SUMMARY OF THE INVENTION

The present invention includes the following means to achieve the above object.

There is provided a power range monitor system including a plurality of average power range monitors for receiving output signals from a plurality of neutron detectors installed in a reactor and detected signals of recirculation flow values in the reactor, and calculating/monitoring a local power value at each part of the reactor, an average reactor power value, and a core flow rate value, a plurality of rod block monitors for monitoring an average value of local power values, of the plurality of local power values, which are obtained around a control rod during a withdrawing operation, by comparing the average reactor power value with the core flow rate value, and a plurality of flow rate signal converters for converting a signal form of the recirculation flow value detection signal and branching the signal into a plurality of electrically isolated signals, each of the flow rate signal converters including means for converting recirculation flow value detected signals into digital signals, converting the signals into, e.g., optical signals, and transmitting the signals to the plurality of average power range monitors, each of the average power range monitors including means for obtaining a core flow rate signal by performing extraction and average value processing for the recirculation detection signals input from the respective flow rate signal converters, using the core flow rate signal to monitor an average reactor power, and transmitting the respective local power values and average reactor power values to the plurality of rod block monitors, and each of the rod block monitors including means for selecting or calculating most adequate values from a plurality of average reactor power from the respective average power range monitors and a plurality of core flow rate signals, and comparing/monitoring the signals.

According to the present invention, since recirculation detection signals are transmitted as digital signals from the flow rate signal converters to the average power range monitors, the data transmission routes can be simplified as compared with a case in which analog signals are transmitted. Although recirculation detection signals are transmitted from the plurality of flow rate signal converters to the respective average power range monitors, the data transmission routes are not complicated.

Since each of the average power range monitors performs extraction and average value processing for detection signals from the respective flow rate signal converters, one average power range monitor can obtain core flow rate signals corresponding to the respective flow rate signal converters. For this reason, the core flow rate signals after computation need not be exchanged between the devices, which is required to simplify the data routes in the analog equipment, thereby shortening a calculation delay time due to a wait for core flow rate signals from other devices and a transmission delay time due to transmission of core flow rate signals to other devices.

In addition, since each control rod block monitor selects a most adequate value from a plurality of core flow rate signals, the function of the rod block monitor can be made free from the influence of the failure of one average power range monitor and one flow rate signal converter. As a result, the overall reliability of the apparatus can be improved.

Furthermore, failures in a given average power range monitor and a given flow rate signal converter can be detected by comparing/monitoring a plurality of core flow rate signals in each rod block monitor. An improvement in failure detection performance facilitates equipment maintenance, and improves the equipment availability.

Moreover, since each rod block monitor selects a most adequate value from a plurality of average reactor power values, the function of the rod block monitor can be made free from the influence of the failure of one average power range monitor. Since the signals from all the average power range monitors are input to each rod block monitor, abnormality in a given average power range monitor can be detected by comparing the average reactor power values from the respective average power range monitors.

In the power range monitor system according to the present invention, the flow rate signal converter, the average power range monitor, and the rod block monitor respectively comprise four flow rate signal converters, six average power range monitors, and two rod block monitors, each of the flow rate signal converters receives two recirculation flow differential pressure signals, converts the signals into digital signals, multiplexes the signals into a serial signal, and transmits the serial signal to the three average power range monitors, each of the average power range monitors receives four recirculation flow signals from the two flow signal converters, obtains two core flow rate signals by performing extraction of the recirculation flow signals and calculating an average value of each of pairs of the signals, uses a smaller one of the obtained signals for monitoring an internal average value signal, and transmits the two core flow rate signals to the two rod block monitors, together with each local power and an average reactor power, and each of the rod block monitors receives six average reactor power signals from the six average power range monitors and 12 core flow rate signals.

According to the present invention, each average power range monitor receives four recirculation flow signals from the two flow rate signal converters to obtain two core flow rate signals, and uses a smaller one of the signals to monitor an internal average value signal. The resultant set value therefore becomes smaller than a monitor set value based on a core flow rate signal, and hence setting can be performed in consideration of safety.

In addition, since all the signals from the six average power range monitors are input to each rod block monitor, a reliable signal can be selected from the signals to be used for a monitoring operation, thereby improving the reliability of the system.

The power range monitor system according to the present invention further includes means of two power supply systems which supply power to the respective devices. In this system, each of the power supply systems includes the two flow rate signal converters, the three average power range monitors, and the one rod block monitor, and the rod block monitor selects or generates a most adequate value from three average reactor power signals, of six average reactor output signals, which are received from the average power range monitors in the same power supply system, selects or generates a most adequate value from three core flow rate signals, of 12 core flow rate signals, which are sent from the same flow rate signal converter, so as to obtain four core flow rate signals corresponding to the respective flow rate signal converters, and then selects or generates a most adequate value from the four core flow rate signals.

According to the present invention, each rod block monitor selects or generates a most adequate value from three average reactor power signals, of six average reactor power signals, which are received from the average power range monitors supplied power from the same power supply system. Even if, therefore, one average power range monitor fails, the monitor function can be maintained.

In addition, each rod block monitor selects or generates a most adequate value from three core flow rate signals from the same flow rate converter, and obtains four core flow rate signals corresponding to the respective flow rate signal converters. The rod block monitor further selects or generates a most adequate value from the four core flow rate signals. In the process of selecting most adequate values, therefore, core flow rate signals exhibiting abnormal values can be removed, thereby preventing abnormal data from affecting the monitor function.

In the power range monitor system according to the present invention, each of the rod block monitor selects a second smallest average reactor power signal as a most adequate signal from average reactor power signals, of three average reactor power signals from the same power supply system, which are generated by average power range monitors operating normally, selects a second largest core flow rate signal as a most adequate value from core flow rate signals, of three core flow rate signals from the same flow rate signal converter, which are generated from average power range monitors operating normally, and selects a smaller core flow rate signal as a most adequate value from core flow rate signals which are left after removing maximum and minimum values from core flow rate signals, of four core flow rate signals selected in correspondence with the flow rate signal converters, which are generated from flow rate signal converters operating normally.

According to the present invention, since the second smallest average reactor power signal of three average reactor power signals from the same power supply system is selected as a most adequate signal, when one average power range monitor fails, a larger one of the two signals is selected. To select a larger one of the two normal signals is to set a large gain. As a result, setting can be performed to easily generate an alarm in consideration of safety. Note that a signal representing the operation state of each average power range monitor can be used to check whether the corresponding average power range monitor is operating normally.

In addition, the second largest core flow rate signal is selected from the three core flow rate signals from each flow rate signal converter, and the maximum and minimum values are removed from the four core flow rate signals selected in correspondence with the respective flow rate signal converters. A smaller one of the remaining core flow rate signals is selected. Since a core flow rate in each rod block monitor is used to calculate a monitor set value, when a smaller one of the two normal core flow rate signals is selected, the monitor set value can be set to a smaller value. Setting can therefore be performed to easily generate an alarm in consideration of safety.

In the power range monitor system according to the present invention, each of the average power range monitors selects a smaller core flow rate signal of two core flow rate signals obtained from four recirculation rate differential pressure signals, monitors the selected core flow rate signal together with a thermal output signal obtained by performing first order lag processing for an average reactor power signal, and generates an alarm signal indicating that a reactor power is in an unstable range upon detection of a low core flow rate, a high thermal output, or both a low core flow rate and a high thermal output, performs a logic operation for the alarm signal in each of the power supply systems, and outputs the resultant signal.

According to the present invention, since a reliable core flow rate signal and a reliable average reactor power signal can be obtained by each average power range monitor, the computation function of determining that the reactor power is in the unstable range upon detection of a low core flow rate, a high thermal output, or both a low core flow rate and a high thermal output in the average power range monitor can be realized by adding/changing the software.

In addition, a redundant system for performing truth/false determination can be constructed by performing a logic operation for the alarm signal in each power supply system.

In the power range monitor system of the present invention, each of the rod block monitors uses a core flow rate signal selected as an optimal value from the four core flow rate signals and an average reactor power signal selected as an optimal value from the three average reactor power signals to monitor the core flow rate signal together with a thermal output signal obtained by performing first order lag processing for the average reactor power signal, and determines that a core power is in an unstable range upon detection of a low core flow rate, a high thermal output, or both a low core flow rate and a high thermal output.

According to the present invention, in each rod block monitor, a calculation function for unstable range determination, equivalent to the one in the above average power range monitor, can be realized.

According to the power range monitor system of the present invention, in the above rod block monitor, four core flow rate signals corresponding to the respective flow rate signal converters are obtained, and an abnormality signal is generated when the maximum deviation between core flow rate signals, of the four core flow rate signals, which are generated from flow rate signal converters with corresponding operation state signals indicating normal operations exceeds a predetermined value.

According to the present invention, abnormality detection can be performed by monitoring the maximum deviation between normal core flow rate signals in each rod block monitor.

In the power range monitor system according to the present invention, the flow rate signal converter, the average power range monitor, and the rod block monitor respectively comprise two flow rate signal converters, six average power range monitors, and two rod block monitors, each of the flow rate signal converters receives two recirculation flow differential pressure signals, converts the signals into digital signals, multiplexes the signals into a serial signal, and transmits the serial signal to the three average power range monitors, each of the average power range monitors receives two recirculation flow signals from the one flow rate signal converter, obtains one core flow rate signal by performing extraction of the recirculation flow signals and calculating an average value of the signals, uses the core flow rate signal for monitoring an internal average power signal, and transmits the core flow rate signal to the two rod block monitors, together with each local power and an average reactor power, and each of the rod block monitors receives six average reactor power signals from the six average power range monitors and six core flow rate signals, selects or generating a most adequate value from three output signals from average power range monitors supplied power from the same power supply system, and further performs small value selection with respect to the core flow rate signals.

According to the present invention, even with the two flow rate signal converters, high reliability equivalent to that realized with the four flow rate signal converters can be realized.

In the power range monitor system according to the present invention, each of the rod block monitors uses a core flow rate signal and an average reactor power signal selected as optimal values to monitor the core flow rate signal together with a thermal output signal obtained by performing first order lag processing for the average reactor power signal, and determines that a reactor power is in an unstable range upon detection of a low core flow rate, a high thermal output, or both a low core flow rate and a high thermal output.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION (First Embodiment)

Figure 5:
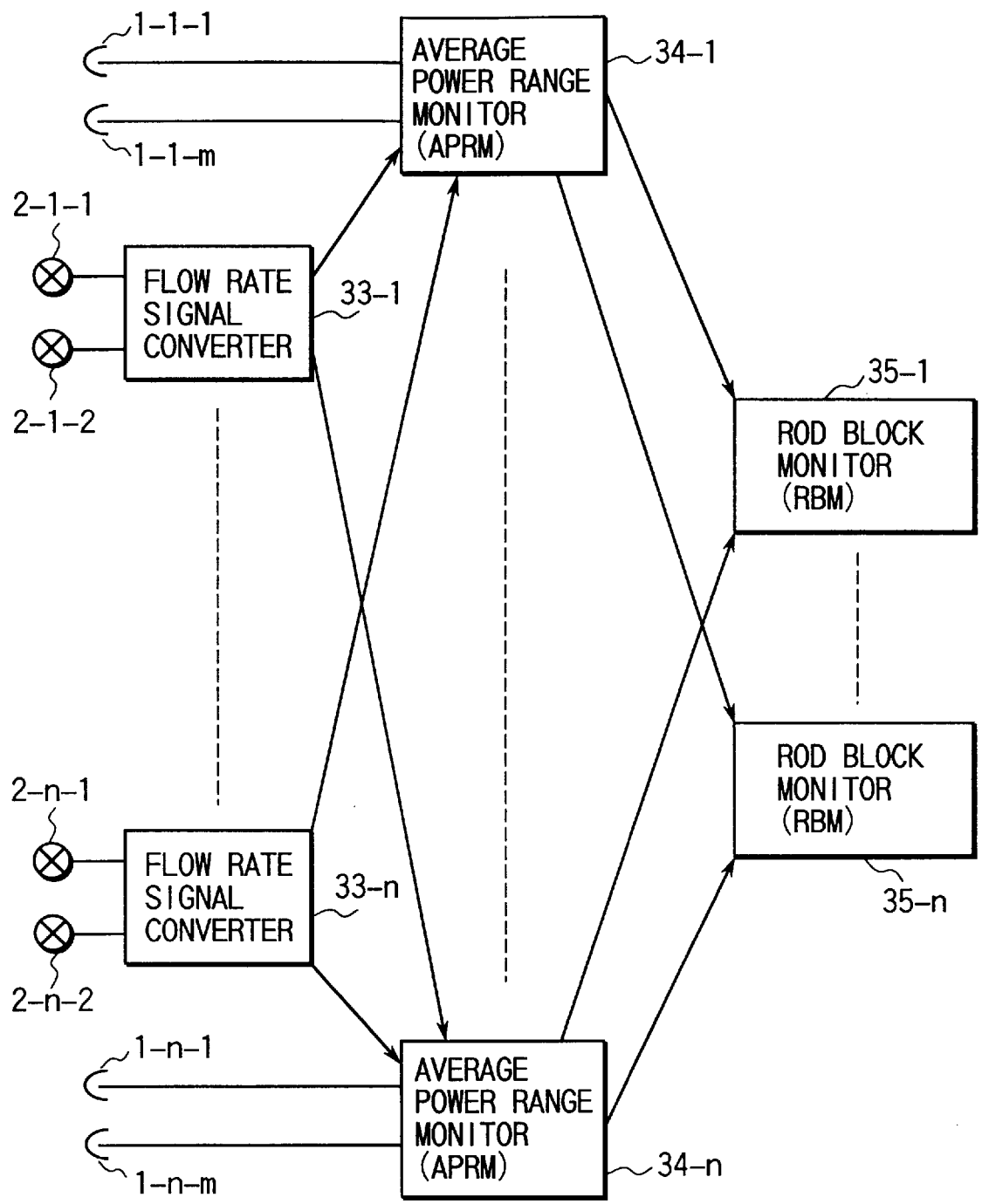
FIG. 5 is a block diagram showing the schematic arrangement of a digital power range monitor system according to the first embodiment of the present invention.

FIG. 5 shows a signal monitoring function in a digital power range monitor system according to the first embodiment of the present invention. This digital power range monitor system includes neutron detectors (1-1-1 to 1-1-m) to (1-n-1 to 1-n-m). The neutron detection signals output from the neutron detectors (1-1-1 to 1-1-m) to (1-n-1 to 1-n-m) are input to average power range monitors 34-1 to 34-n in the corresponding segments. The differential pressure signals output from recirculation flow differential signal transmitters 2-1-1 to 2-n-2 are input to corresponding flow rate signal converters 33-1 to 33-n.

In this embodiment, the flow rate detection signals (differential pressure signals) are converted into digital values by the flow rate signal converters 33-1 to 33-n and are concurrently input to the average power range monitors 34-1 to 34-n. Since the average power range monitors 34-1 to 34-n have an SRI function, SRI monitoring (monitoring a low core flow rate and a high TPM (Thermal Power Monitor)) can be performed. More specifically, the average power range monitors 34-1 to 34-n perform extraction calculation of the respective differential pressure signals first, and then calculate the averages of the calculated values to acquire core flow rate signals, thereby executing determination of a low core flow rate. In addition, the average power range monitors 34-1 to 34-n obtain local power values from the neutron detection signals, and obtain average reactor power values from the local power values and the core flow rate signals, thereby executing determination of a high TPM on the basis of this average reactor power values. The core flow rate signals obtained by the average power range monitors 34-1 to 34-n from the differential pressure signals, the average reactor power values, and the respective local power values are concurrently input to rod block monitors 35-1 to 35-n. The rod block monitors 35-1 to 35-n select or calculate most adequate values from the input average reactor power and the input core flow rate signals, and compare/monitor the respective signals.

Figure 6:
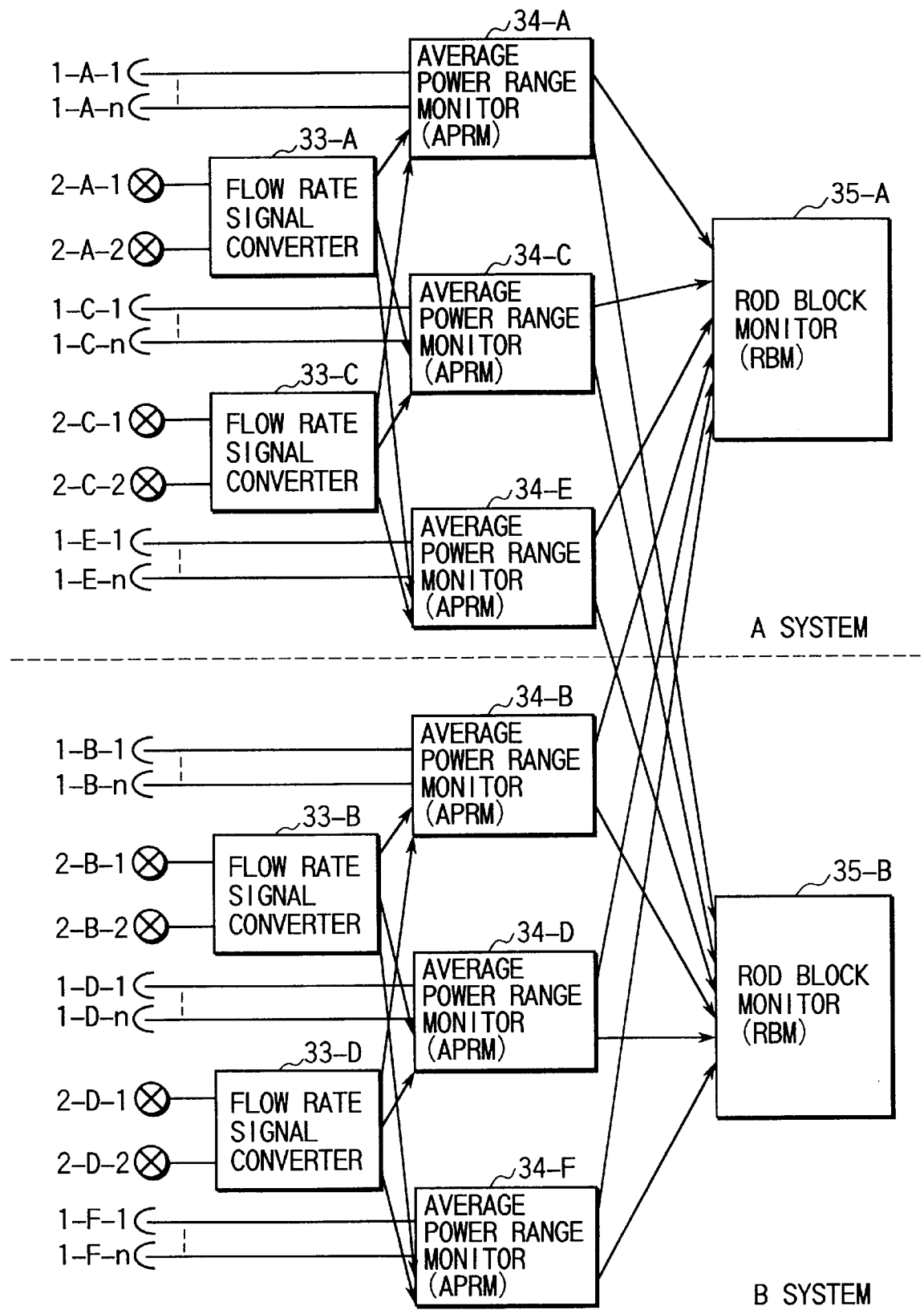
FIG. 6 is a block diagram showing the arrangement of the digital power range monitor system of the embodiment.

FIG. 6 shows the arrangement of a system according to the first embodiment which is constituted by four flow rate signal converters 33-A to 33-D, six average power range monitors 34-A to 34-F, and two rod block monitors 35-A and 35-B. The following description is based on the system arrangement shown in FIG. 6. Differential pressure signals representing the measurement values of recirculation flow are input from recirculation flow differential pressure signal transmitters 2-A-1, 2-A-2, 2-C-1, and 2-C-2 to the flow rate signal converters 33-A and 33-C in the A system. Differential pressure signals representing the measured values of recirculation flow values are input from recirculation flow differential pressure signal transmitters 2-B-1, 2-B-2, 2-D-1, and 2-D-2 to the flow rate signal converters 33-B and 33-D in the B system. The three average power range monitors 34-A, 34-C, and 34-E are installed in the A system. Differential pressure signals are concurrently input from the flow rate signal converters 33-A and 33-C in the A system to these average power range monitors 34-A, 34-C, and 34-E. The three average power range monitors 34-B, 34-D, and 34-F are installed in the B system. Differential pressure signals are concurrently input from the two flow rate signal converters 33-B and 33-D in the B system to these average power range monitors 34-B, 34-D, and 34-F. Neutron detection signals are input from neutron detectors (1-A-1 to 1-A-m), (1-B-1 to 1-B-m), (1-C-1 to 1-C-m), (1-D-1 to 1-D-m), (1-E-1 to 1-E-m), and (1-F-1 to 1-F-m) to the respective average power range monitors 34-A to 34-F.

Data transmission paths are constructed such that signals are transmitted from the respective average power range monitors 34-A to 34-F in the A and B systems to the rod block monitor 35-A in the A system, and signals are transmitted from the respective average power range monitors 34-A to 34-F in the A and B systems to the rod block monitor 35-B in the B system.

Figure 7:
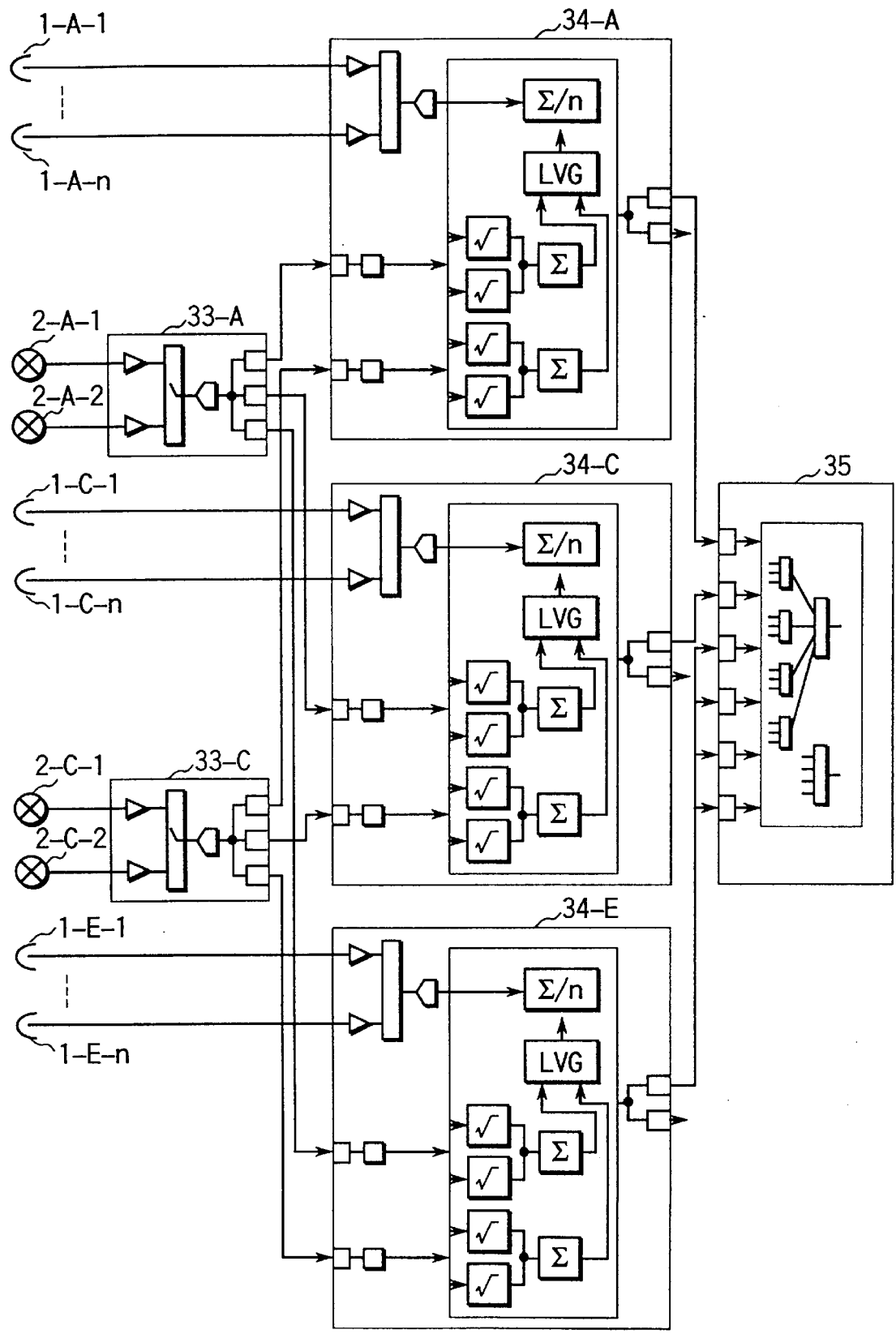
FIG. 7 is a circuit diagram showing the arrangement of the A system of the digital power range monitor system of the embodiment.

FIG. 7 shows the detailed system arrangement in the A system. In this digital power range monitor system, the system arrangements in the A and B systems are the same. Since the details of the system arrangement in the B system are the same as those in the A system, a description thereof will be omitted.

Figure 8:
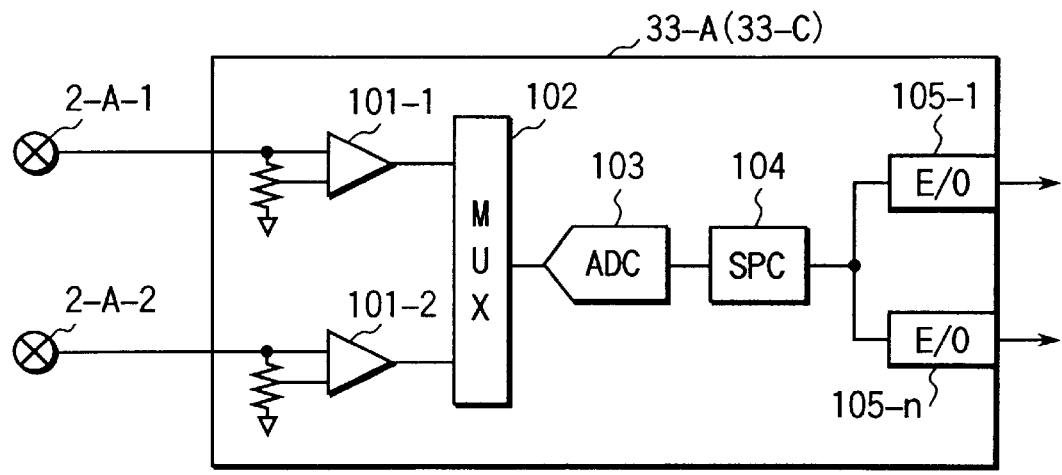
FIG. 8 is a circuit diagram showing the arrangement of a flow rate signal converter in the embodiment.

FIG. 8 shows the arrangement of a flow rate signal converter 33-A (or 33-C). As shown in FIG. 8, the differential pressure signals input from the recirculation flow differential pressure signal transmitters 2-A-1 and 2-A-2 are converted into voltage signals by current/voltage conversion circuits 101-1 and 101-2, and the voltage signals are concurrently input to a multiplexer 102. The differential pressure signals selectively received by the multiplexer 102 are converted into digital signals by an analog/digital converter 103 connected to the multiplexer 102. The outputs from the analog/digital converter 103 are converted into serial signals by a parallel/serial conversion circuit 104 to be concurrently input to electrical/optical signal conversion circuits 105-1 to 105-n. These signals are then optically transmitted from the electrical/optical signal conversion circuits 105-1 to 105-n to the average power range monitors 34-A, 34-C, and 34-E in the A system.

Note that each of the remaining flow rate signal converters in the A and B systems converts input differential pressure signals into digital signals and optically transmits the signals to the corresponding average power range monitors through the transmission paths shown in FIG. 6 in the same manner as the flow rate signal converter 33-A.

Figure 9:
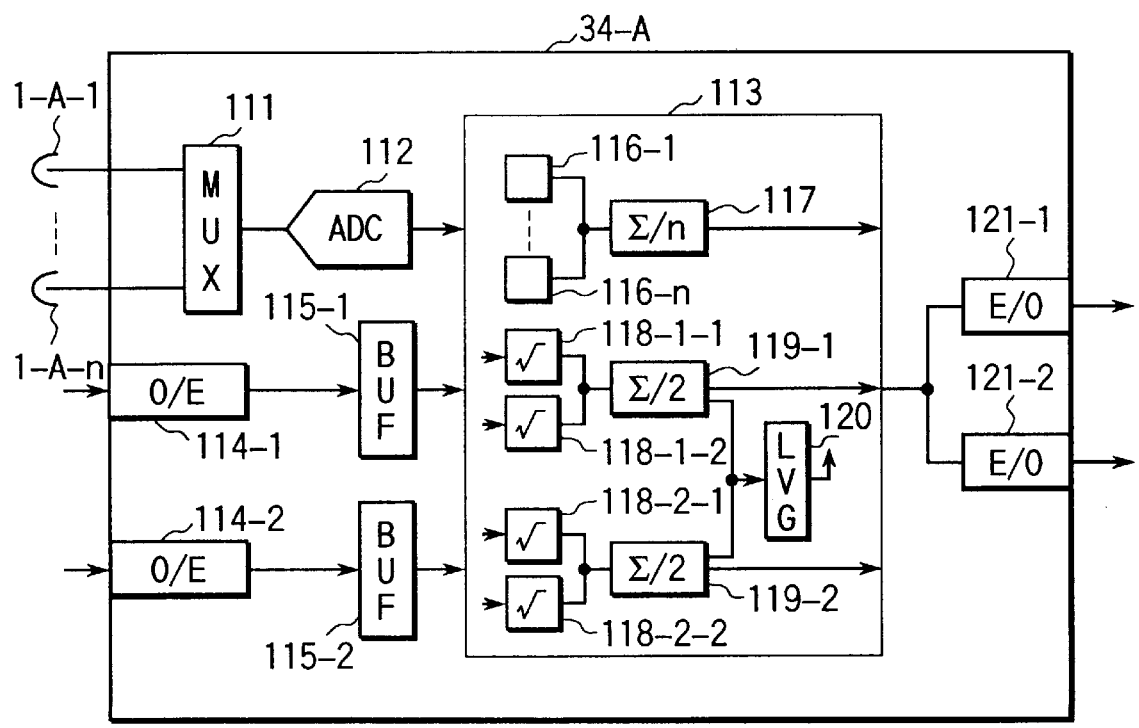
FIG. 9 is a circuit diagram showing the arrangement of an average power range monitor in the embodiment.

FIG. 9 shows the arrangement of the average power range monitor 34-A (or 34-C or 34-E). As shown in FIG. 9, the neutron detection signals input from the neutron detectors 1-A-1 to 1-A-m are selectively received by a multiplexer 111 to be converted into digital signals by an analog/digital converter 112. The digital signals are then input to a calculation section 113. In the calculation section 113, neutron detector signal processing sections 116-1 to 116-m calculate the local power values of the corresponding digital signals of the neutron detection signals, and an average calculation section 117 performs computation processing for these local power values to calculate an average reactor power value.

The transmission data of the differential pressure signals input from the flow rate signal converters 33-A and 33-C to the average power range monitor 34-A (or 34-C or 34-E) are converted into electrical transmission data by optical/electrical signal conversion circuits 114-1 and 114-2, each forming one end of each of the optical transmission paths arranged between the flow rate signal converters 33-A and 33-C. The data are then stored in a hardware manner in input buffer memories 115-1 and 115-2 arranged in correspondence with the optical/electrical signal conversion circuits 114-1 and 114-2. When the average power range monitor reads out the transmission data stored in the input buffer memories 115-1 and 115-2, the transmission data can be supplied to the calculation section 113 without causing the microprocessor in the average power range monitor to perform transmission processing between the flow rate signal converters.

The transmission data of the differential pressure signals from the recirculation flow differential pressure signal transmitters 2-A-1 and 2-A-2 which are serially transmitted from the flow rate signal converter 33-A are stored in the input buffer memory 115-1. The transmission data of the differential pressure signals from the recirculation flow differential pressure signal transmitters 2-A-1 and 2-A-2 are input from the input buffer memory 115-1 to extraction sections 118-1-1 and 118-1-2. The extraction results are then input to an average calculation section 119-1 to calculate the average of the results. The transmission data of the differential pressure signals from the recirculation flow differential pressure signal transmitters 2-C-1 and 2-C-2 which are serially transmitted from the flow rate signal converter 33-C are stored in the other input buffer memory 115-2. Similarly, these data are input to extraction sections 118-2-1 and 118-2-2, and the extraction results are input to an average calculation section 119-2 to calculate the average of the results.

The flow rate signals of a plurality of loops output from the average calculation sections 119-1 and 119-2 are input a smaller value selection section 120, and sent to electrical/optical signal conversion circuits 121-1 and 121-2 to be converted into optical signals. The optical signals are then optically transmitted to the rod block monitors 35-A and 35-B in the A and B systems.

The remaining average power range monitors in the A and B systems process input neutron detection signals and input differential pressure signals and optically transmit the resultant data concurrently to the rod block monitors 35-A and 35-B through the transmission paths shown in FIG. 6 in the same manner as the average power range monitor 34-A.

Figure 10:
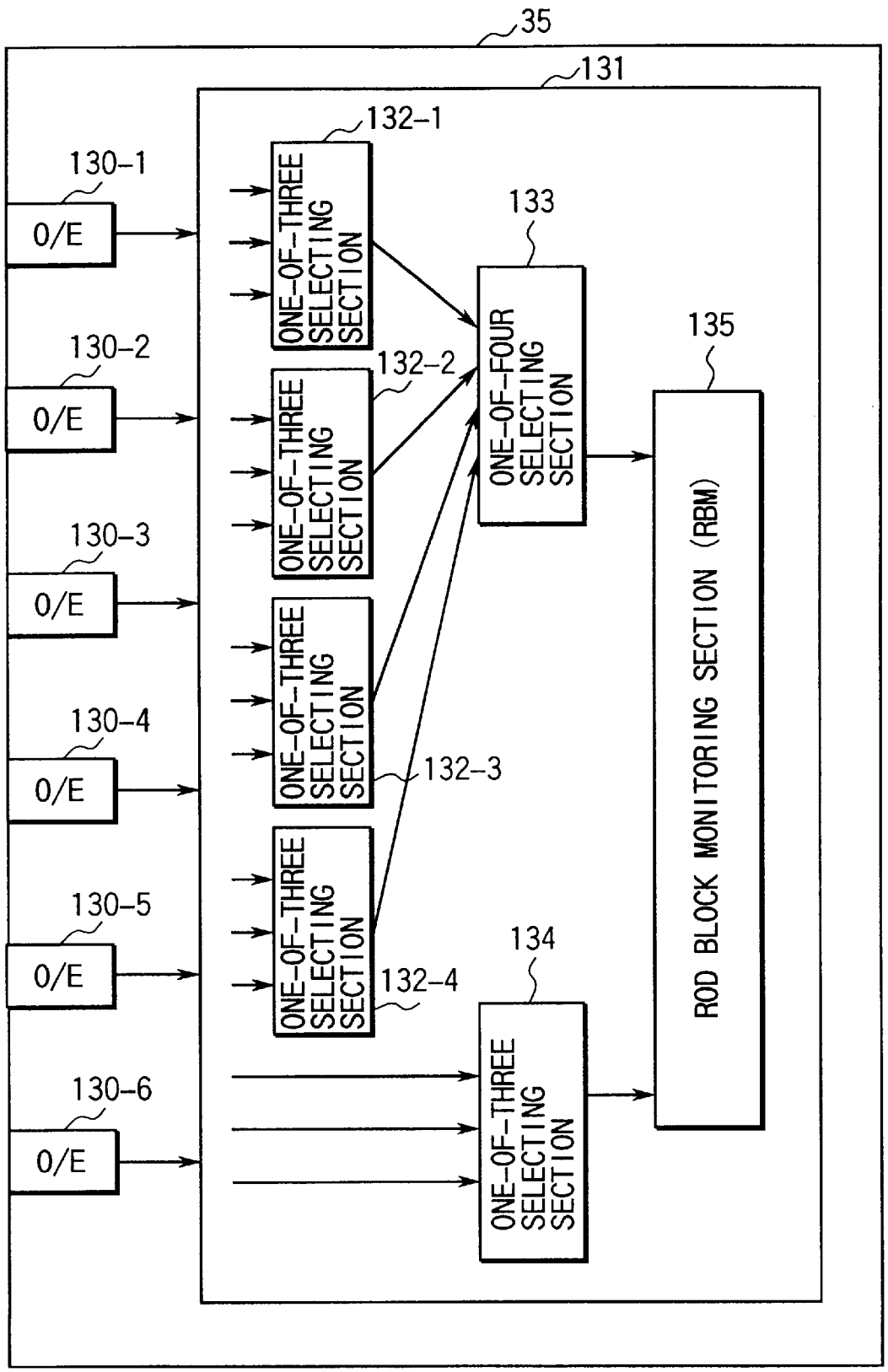
FIG. 10 is a block diagram showing the arrangement of a rod block monitor in the embodiment.

FIG. 10 shows the arrangement of the rod block monitor 35-A (or 35-B).

Figure 11:
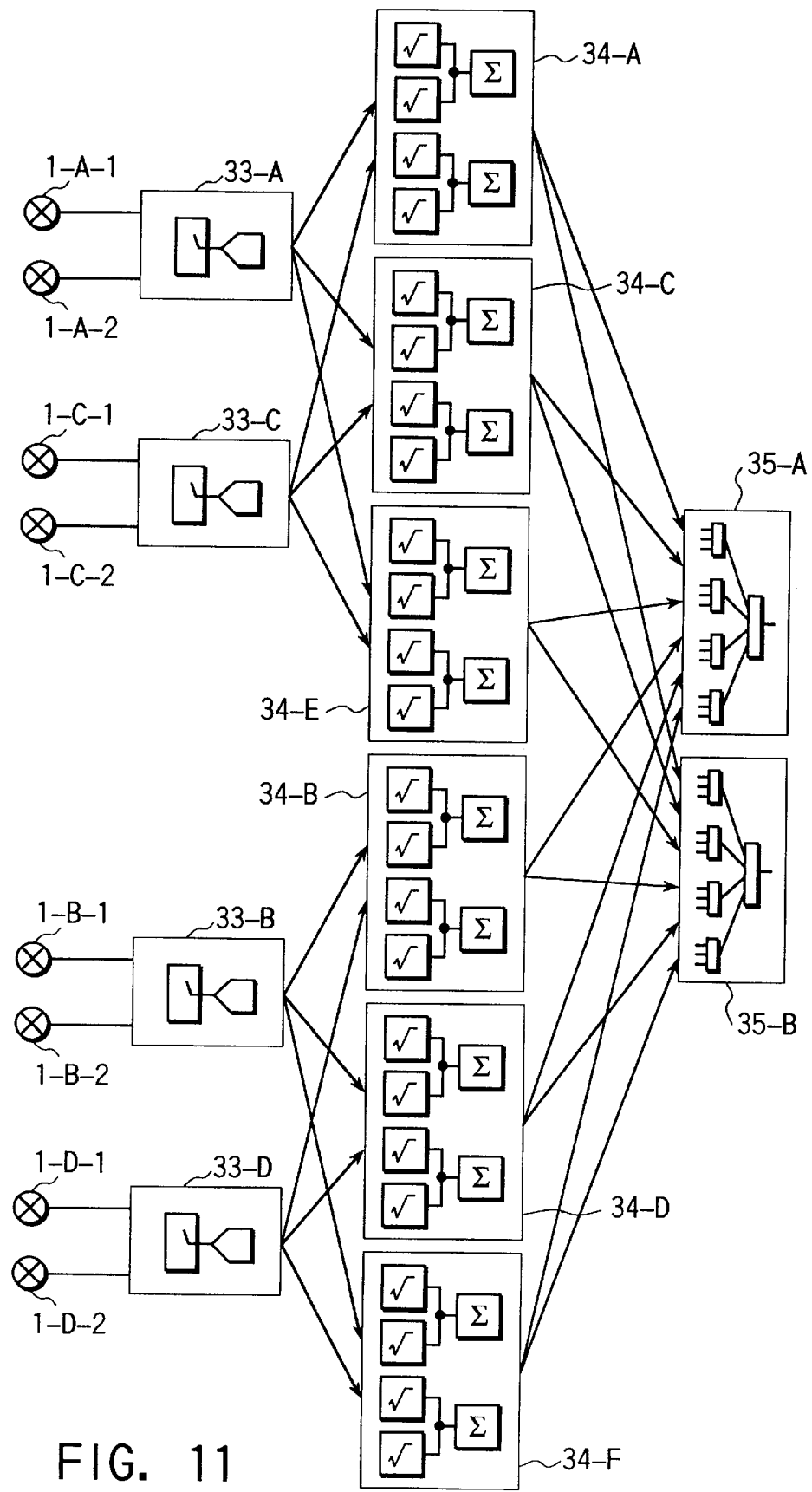
FIG. 11 is a circuit diagram showing the system arrangement which indicates the flow of processing of recirculation flow differential pressure signals in the embodiment.

In this embodiment, as shown in FIG. 11, there are four sets of recirculation flow differential pressure signals, and the recirculation rate differential pressure signals of each set are concurrently input to the three average power range monitors (34-A, 34-C, and 34-E or 34-B, 34-D, and 34-F). Six optical/electrical signal conversion circuits 130-1 to 130-6 respectively connected to all the average power range monitors 34-A to 34-F in the A and B systems are provided for one rod block monitor 35-A. The data received by these optical/electrical signal conversion circuits 130-1 to 130-6 are input to a calculation section 131.

The calculation section 131 includes four one-of-three selecting sections 132-1 to 132-4 in correspondence with the four sets of recirculation flow differential pressure signals. Each of the one-of-three selecting sections 132-1 to 132-4 receives three core flow rate signals calculated from corresponding recirculation flow differential pressure signals. Each of the one-of-three selecting sections 132-1 to 132-4 selects the second largest signal of the three input core flow rate signals to determine a true core flow rate signal obtained from one set of recirculation flow differential pressure signals.

The four core flow rate signals selected by these four one-of-three selecting sections 132-1 to 132-4 are input to a one-of-four selecting section 133. The one-of-four selecting section 133 removes the maximum and minimum values from the four core flow rate signals corresponding to the four sets of recirculation flow differential pressure signals, and selects a smaller one of the remaining values.

The rod block monitor 35-A in the A system receives the calculation data of the average reactor power values from the three average power range monitors 34-A, 34-C, and 34-E in the A system, and inputs these three average reactor power value data to a one-of-three selecting section 134. The one-of-three selecting section 134 selects the second smallest value of the three average reactor power values calculated by the three average power range monitors 34-A, 34-C, and 34-E.

The rod block monitor 35-B in the B system receives the calculation data of the average reactor power values from the three average power range monitors 34-B, 34-D, and 34-F in the B system, and inputs these three average reactor power value data to the one-of-three selecting section 134. The one-of-three selecting section 134 selects the second smallest value of the three average reactor power values.

The one core flow rate signal selected by the one-of-four selecting section 133 from the four core flow rate signals and the one average reactor power value selected by the one-of-three selecting section 134 from the three average reactor power values are input to a rod block monitoring section 135. The rod block monitoring section 135 executes rod block inhibition determination on the basis of the core flow rate signal and the average reactor power value.

The operation of the embodiment having the above arrangement will be described next. If the contents of processing performed in the A and B system are substantially the same, only the processing in the A system will be described.

(1) Core Flow Rate Signal Calculation

In the flow rate signal converters (33-A and 33-C), two recirculation flow differential pressure signals are converted into digital values and multiplexed. The resultant values are concurrently transmitted as optical serial signals to the three average power range monitors (34-A, 34-C, and 34-E) in the same power source system. Each of the average power range monitors (34-A, 34-C, and 34-E) performs extraction, average calculation, and small value selection calculation. The resultant data are then supplied for monitoring of an average reactor power in each of the average power range monitors (34-A, 34-C, and 34-E).

In the above series of operations, in the flow rate signal converters (33-A and 33-C), two recirculation flow differential pressure signals are sequentially selected by using the multiplexer 102, and these signals are subjected to analog/digital conversion. The results (parallel signals) are converted into serial signals and output as optical signals. The above process is controlled by using only hardware constituted by a gate array to shorten the processing time as compared with software processing using microprocessors.

In addition, since the transmission data from the flow rate signal converters (33-A and 33-C) are written in the input buffer memories (115-1 and 115-2) by means of hardware, the microprocessors of the average power range monitors (34-A, 34-C, and 34-E) need not perform transmission processing with respect to the flow rate signal converters (33-A and 33-C).

Figure 1:
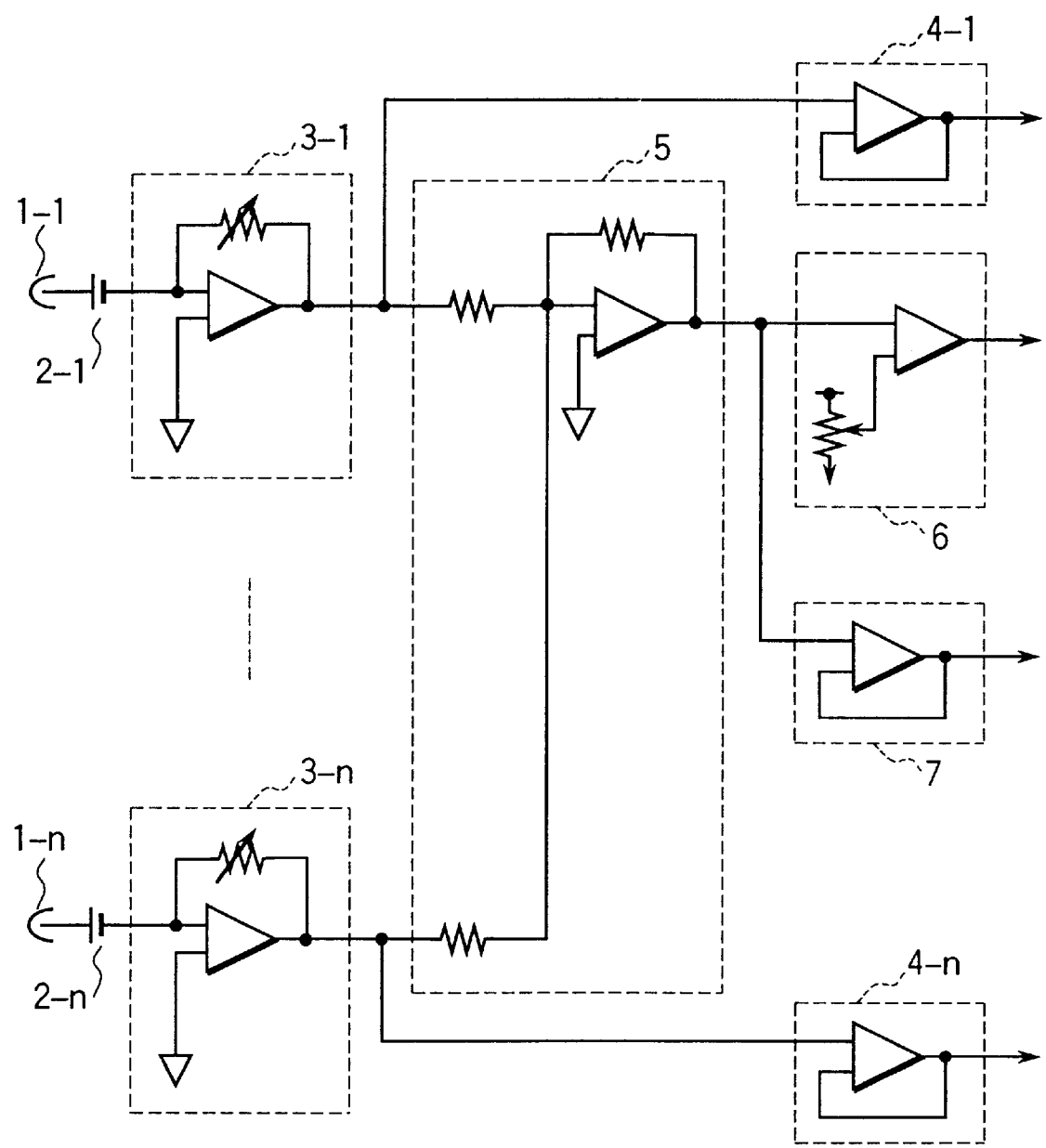
FIG. 1 is a circuit diagram showing the circuit arrangement of analog equipment in a conventional analog power range monitor system.

According to this processing form, data transmission between devices can be simplified as compared with a case wherein the arrangement of analog equipment is faithfully digitized (the system in FIG. 1).

Figure 2:
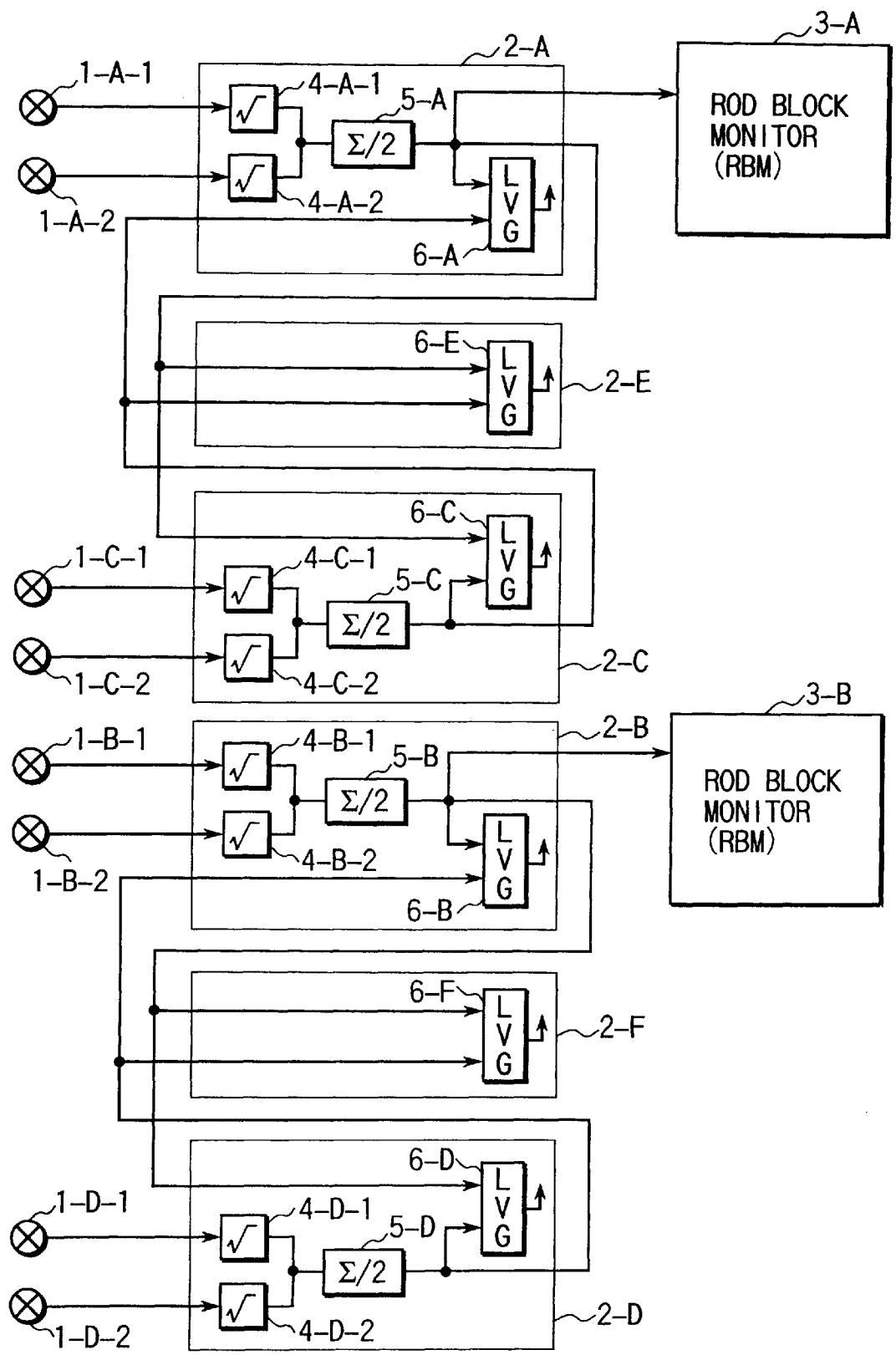
FIG. 2 is a circuit diagram showing an equipment arrangement for exchanging core flow rate signals between the monitors in a conventional analog power range monitor system.
Figure 3:
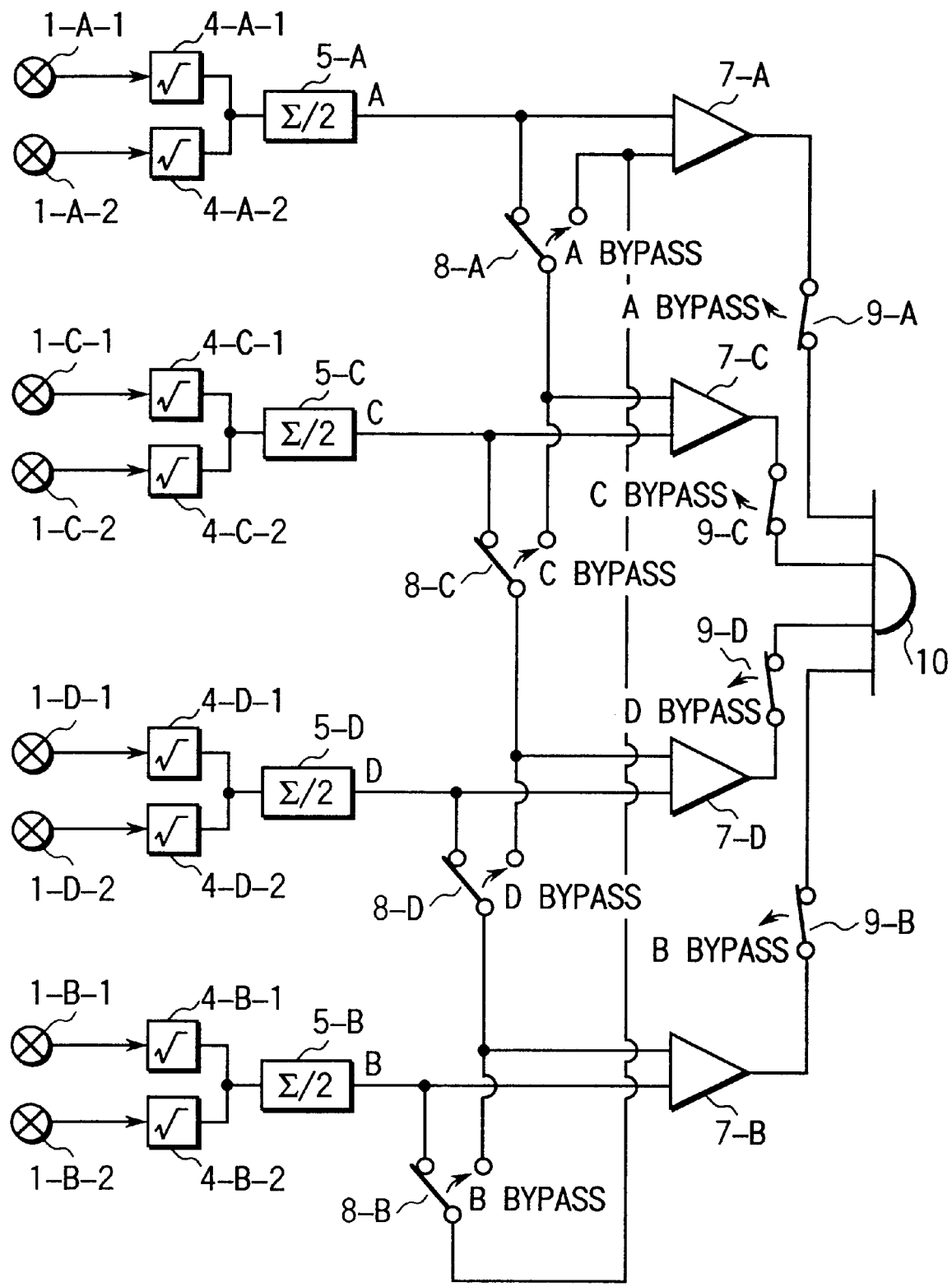
FIG. 3 is a circuit diagram showing a circuit arrangement for comparing core flow rate signals in the a conventional power range monitor system.
Figure 4:
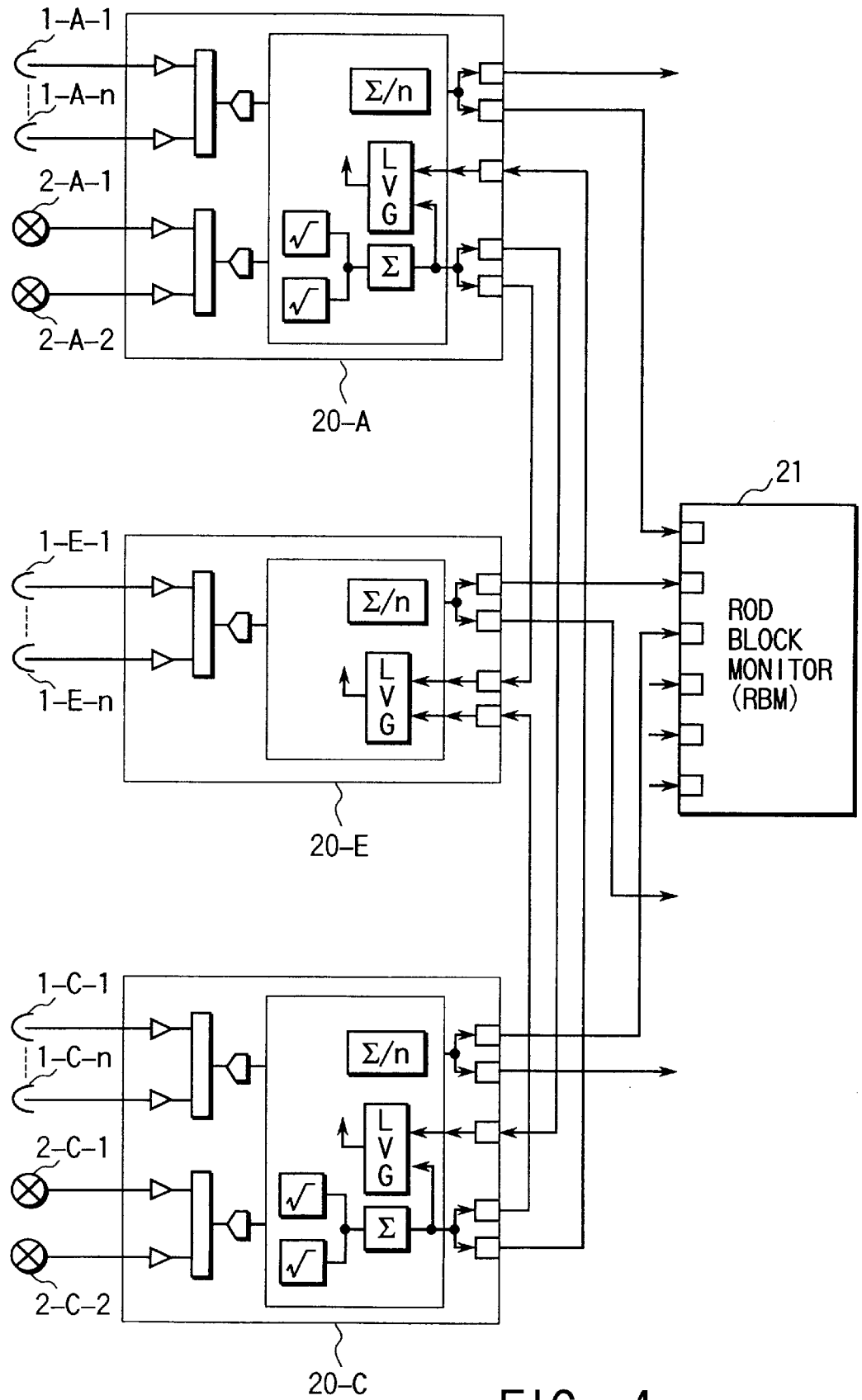
FIG. 4 is a circuit diagram showing digital equipment in a digital power range monitor system obtained by digitization of the conventional analog power range monitor system.

More specifically, in the arrangement (e.g., the arrangement shown in FIG. 2) obtained by faithful digitization of the arrangement of analog equipment, each of four out of six average power range monitors calculates one core flow rate, and the calculation results are transmitted between the respective average power range monitors to transmit the calculation results to the two remaining average power range monitors. In this case, to obtain two core flow rate signals used in one average power range monitor, two average power range monitors must operate normally, leading to a deterioration in the reliability of the system.

Furthermore, a delay time produced when a dedicated transmission path is used to input a core flow rate signal from another average power range monitor or a normal transmission path through which other data are also transmitted is used to transmit a core flow rate signal is longer than that produced when transmission is performed by using only the above hardware. To use dedicated transmission paths is to complicate the equipment arrangement, lessening the merit of digitization. When a normal transmission path is to be used, since the amount of data to be transferred is large, the delay time due to data transmission is prolonged. In any case, to realize the function of one average power range monitor, the remaining average power range monitors must operate normally. That data transmission needs to be performed with other average power range monitors raises the possibility that abnormality in data transmission adversely affects the function of each average power range monitor. That is, this arrangement deviates from the design principle associated with device isolation.

(2) Core Flow Rate Selection and Comparison in Control Rod Removal Monitor

As described above, all sets of three core flow rates calculated from one set of recirculation rate differential pressure signals (1-X-1, 1-X-2; X=A to D) are input to the rod block monitors (35-A and 35-B), and the second largest signal is selected from each set of three core flow rate signals, thereby determining a true core flow rate signal obtained from one set of recirculation flow differential pressure signals.

When one average power range monitor is in an abnormal state, the core flow rate signal therefrom is excluded from selection; a smaller value is selected from the two remaining signals. In addition, the maximum and minimum values are removed from four core flow rate signals corresponding to four sets of recirculation flow differential pressure signals, and a smaller value of the remaining two values is selected. When one flow rate signal converter is in an abnormal state, the core flow rate corresponding thereto is excluded from selection; an intermediate value is selected.

The core flow rate in each rod block monitor is used for calculation of a monitor set value. To select a smaller one of two normal signals is therefore to set the monitor set value to a smaller value. With this selection, an alarm is generated more easily. That is, this system is suited for the safety design principle.

This system can therefore prevent the failure of one average power range monitor and one flow rate signal converter from adversely affecting the function of each rod block monitor, thereby improving the overall reliability of the system.

In addition, failures in an average power range monitor and a flow rate signal converter can be detected by comparison with other signals. An improvement in failure detection performance facilitates equipment maintenance, and can improve the equipment availability.

(3) Average Nuclear Reactor Power Selection and Comparison in Rod Removal Block monitor Since data from all the average power range monitors can be input to each rod block monitor, the second smallest value can be selected from normal values of the three average reactor power values sent from three average power range monitors in the same power supply system. With this selection, even if one average power range monitor is operating abnormally, a larger one of two signals is selected.

As an average reactor power value used to adjust the gain of a monitor signal in each rod block monitor, a larger one of two normal signals is selected. With this selection, a large gain is set. As a result, setting is performed to generate an alarm easily. This system is therefore suited for the safety design principle.

This system can therefore prevent the failure of one average power range monitor from affecting the function of each rod block monitor. According to the conventional analog equipment, since an average reactor power signal from a specific average power range monitor is used for gain setting in each rod block monitor, if this average power range monitor fails, the function of the rod block monitor may be adversely affected.

In addition, since signals from all the average power range monitors are input to each rod block monitor, abnormality in an average power range monitor can be detected by comparing average reactor power signals from the respective average power range monitors.

(4) Determination of Unstable Range of Reactor Power

According to digital equipment using microprocessors, addition/deletion with respect to the calculation function for a value received as a digital signal can be easily performed by changing the programs. With this advantage, the function of determining an unstable range of nuclear reactor power, which is executed by a separate device in the conventional analog equipment, can be executed by an average power range monitor or a rod block monitor.

The function of determining an unstable range of nuclear reactor power is the function of monitoring a low core flow rate and a high thermal output state by using thermal output values and core flow rate values of the reactor which are obtained by performing first order lag calculation for the average power of the reactor.

In actual unstable range determination, alarm signals are respectively output when the core flow rate becomes lower than a set level, and when the thermal output becomes larger than a set value, and an alarm is generated when the above states occur at once.

When unstable range determination is to be executed by the average power range monitors, a redundant system can be constructed, in which the respective average power range monitors independently perform unstable range determination, and the respective results are input to a logic circuit to be subjected to a logical operation.

When unstable range determination is to be executed by each rod block monitor, optimal values are selected from the average reactor power and the core flow rate signals input from the respective average power range monitors by the methods (2) and (3), and an unstable range is determined by using the selected values.

In any case, the reliability of the apparatus can be improved as compared with the conventional analog equipment having neither redundant arrangement nor function of selecting optimal values from a plurality of signals.

In the above digital power range monitor system, eight recirculation rate differential pressure signals (1-A-1, 1-A-2, ..., 1-D-1, 1-D-2) are used for the overall system. The same effect, however, can be obtained by using four recirculation flow differential pressure signals for the overall system.

As described above, according to this embodiment, there is provided a digital power range monitor system which can drastically solve the problems in the conventional analog power range monitor system and the conventional digital power range monitor system are drastically solved, and can perform a monitor operation with high reliability.

In the conventional analog power range monitor system, a dedicated circuit is required to realize each function, and signal connection between the circuits is performed with electrical signals. For this reason, to perform complicated signal processing, a large circuit is required. In addition, when signals are to be exchanged between the devices, the respective devices must be electrically isolated from each other. For this purpose, an electrical signal isolation device such as an isolation amplifier is placed in each signal route.

In the conventional digital power range monitor system, the digital equipment can easily perform complicated calculations. However, since each calculation is realized by executing a program using the microprocessor, each calculation is executed once for every execution cycle of the program, resulting in discrete processing in terms of time. A calculation delay time is therefore produced. The power range monitor system, in particular, has the function of instantaneously detecting an abnormal rise in nuclear reactor power, which is associated with the safety of the reactor, and outputting a scram signal for emergency stop of the reactor. The digital equipment must preferentially process this scram signal. In addition, since signal connection between the devices in the digital equipment is performed by data transmission, a large number of signals can be transmitted/received through one transmission means. The equipment arrangement can therefore be simplified. There is, however, a delay time accompanying data transmission.

In addition, when the conventional analog power range monitor system is to be replaced with a digital power range monitor system, some countermeasures are required against a signal processing delay in the digital equipment. Although advanced computation functions and simplification of equipment arrangement can be realized, since the functions are realized in an intensive form, one device failure may greatly affect the system. For this reason, the influence ranges of such failures must be limited to prevent any problem in terms of system function.

In contrast to this, according to this embodiment, the same computation is executed by a plurality of devices to simplify the data transmission routes so as to reduce the influences of a delay time due to digital signal processing and a delay time due to data transmission. In addition, in the embodiment, by comparing the results obtained by executing the same calculation in a plurality of devices, a failure can be detected, and the failure of one device can be prevented from affecting the system. According to the embodiment, therefore, a power range monitor system with high reliability can be provided.

(Second Embodiment)

Figure 12:
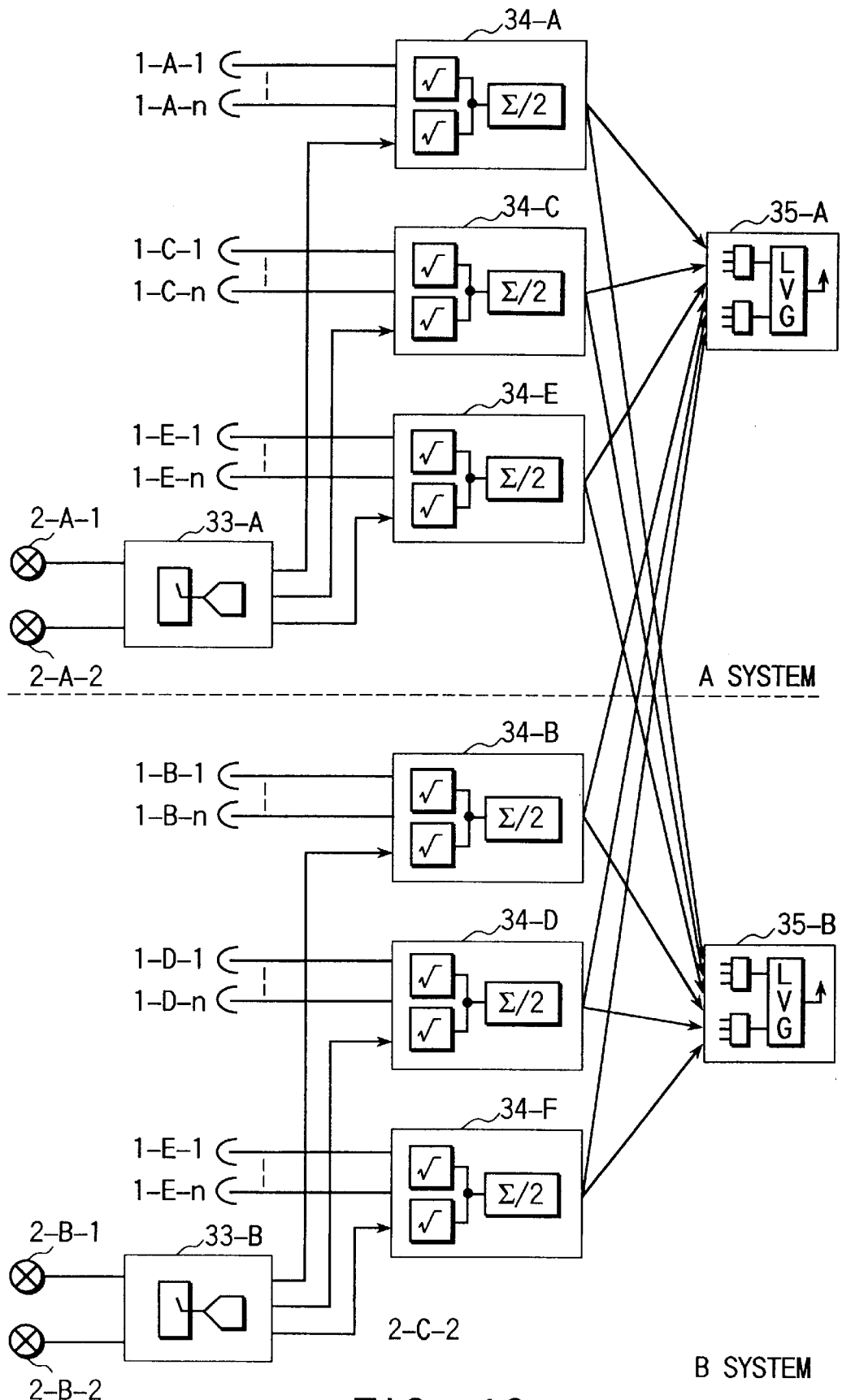
FIG. 12 is a circuit diagram showing the arrangement of a system according to the second embodiment of the present invention.

FIG. 12 shows the arrangement of a system using four recirculation rate differential pressure signals for the overall system. Assume that each block has the same function as that in the above embodiment.

This system differs from the system using eight recirculation flow differential pressure signals in that one core flow rate is obtained in one average power range monitor (34-A to 34-F), and six core flow rate signals are compared with each other by each rod block monitor (35-A and 35-B).

Each of the rod block monitors 35-A and 35-B selects one core flow rate signal from each set of three core flow rate signals by the method (2), and determines an optimal value by selecting a smaller value of the two obtained core flow rate signals. In addition, each rod block monitor selects an average reactor power signal by the method (3). Furthermore, abnormality in an average power range monitor can be detected in these comparing/selecting operations, and an unstable range of reactor power can be determined by each average power range monitor or each rod block monitor.

(Third Embodiment)

Figure 13:
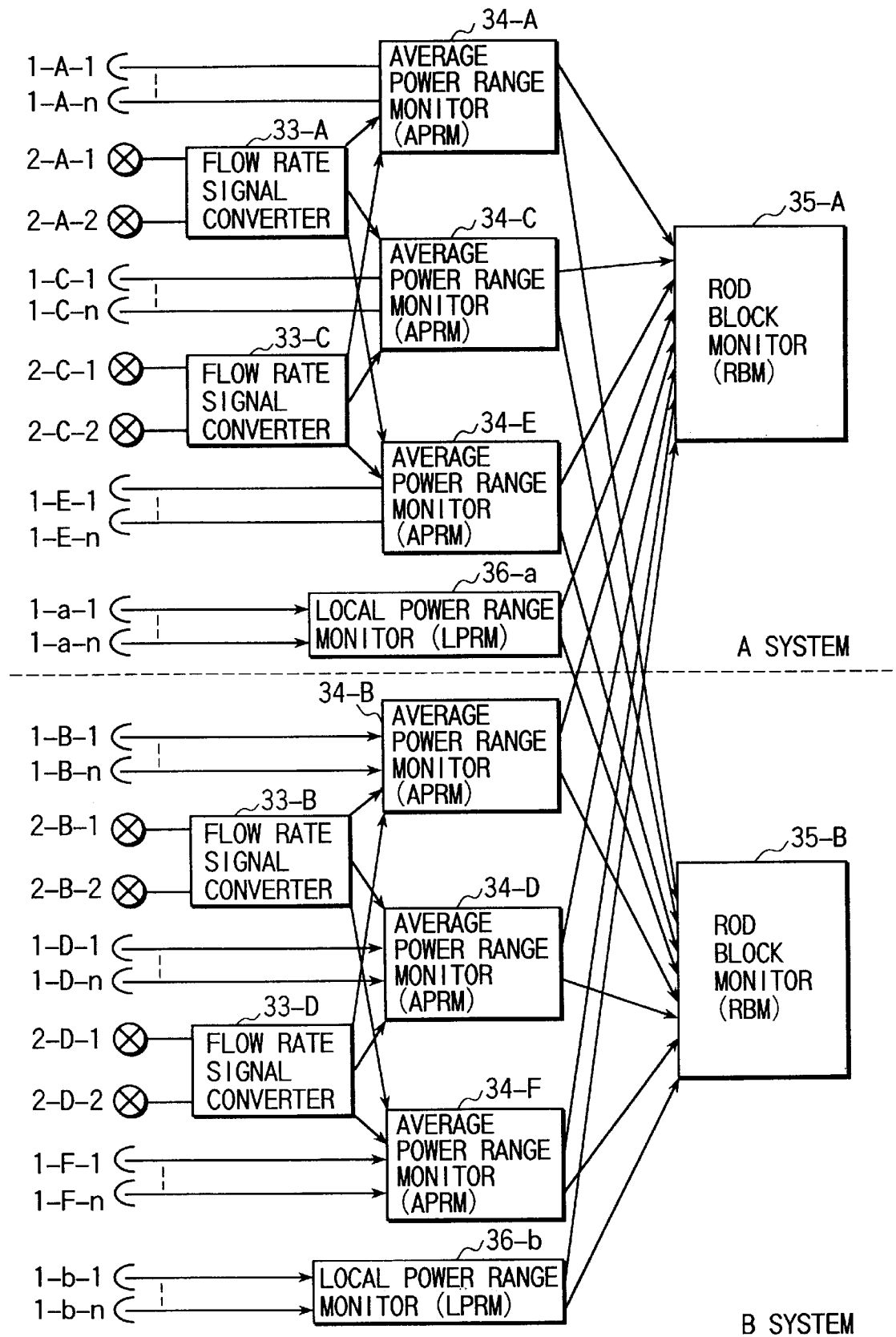
FIG. 13 is a circuit diagram showing the arrangement of a system according to the third embodiment of the present invention.

The system may include functional elements other than those in the above embodiments, as needed. For example, as shown in FIG. 13, local power monitors 36-a and 36-b for supplying only the signals from the neutron detectors to the rod block monitors can be installed in the respective power supply systems. Note that the local power monitors 36-a and 36-b are equivalent to average power range monitors from which the core flow rate calculation function and the average reactor power calculation function are withdrew.

According to the present invention described in detail above, there is provided a power range monitor system which can reduce the influences of a delay time due to digital signal processing and a delay time due to data transmission by executing the same calculation in a plurality of devices to simplify the data transmission routes, and can detect a failure and prevent the failure of one device from affecting the system by comparing the results obtained by executing the same calculation in a plurality of devices, thereby improving the reliability of the system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. A power range monitor system for a reactor, comprising:

neutron detectors installed in the reactor;

recirculation detection means for detecting recirculation flow values of the reactor;

a flow rate signal converter for converting analog recirculation detection signals from said recirculation detection means into digital recirculation detection signals;

a plurality of average power range monitors each for receiving neutron detection signals from said neutron detectors and the digital recirculation detection signals from said flow rate signal converter, and calculating/monitoring a local power value from each part of the reactor, an average reactor power value, and a core flow rate value, said average power range monitor including means for obtaining a core flow rate signal used to monitor an average reactor power by performing extraction of the digital recirculation detection signals, and averaging the digital recirculation detection signals, and transmission means for transmitting the core flow rate value, the local power value, and the average reactor power value; and a plurality of rod block monitors for monitoring an average value of local power values, of the plurality of local power values input through said transmission means of said average power range monitors, which are obtained around a control rod during a withdrawing operation, by comparing the average reactor power value with the core flow rate value, each said rod block monitor including means for extracting a selected value from the plurality of average reactor power values and a selected value from the plurality of core flow rate values, and comparing/monitoring the selected values.

2. A system according to claim 1, wherein said flow rate signal converter, said average power range monitors, and said rod block monitors respectively comprise four flow rate signal converters, six average power range monitors, and two rod block monitors, each of said flow rate signal converters comprises means for receiving two recirculation differential pressure signals, converting the signals into digital signals, multiplexing the signals into a serial signal, and transmitting the serial signal to three of said average power range monitors, each of said average power range monitors comprises means for receiving four recirculation rate signals from two of said flow rate signal converters, obtaining two core flow rate signals by performing extraction of the recirculation rate signals and calculating an average power range of each of pairs of the signals, using a smaller one of the obtained core flow rate signals for monitoring an internal average power range signal, and transmitting the two core flow rate signals to said two rod block monitors, together with each local power value and an average reactor power value, and each of said rod block monitors comprises means for receiving six average reactor power values from said six average power range monitors and 12 core flow rate signals.

3. A system according to claim 2, further comprising two power supply systems, each supplying power to two flow rate signal converters, three average power range monitors, and one rod block monitor, said rod block monitor comprising means for selecting or generating a selected value from three average reactor power signals, of six average reactor power signals, which are received from said average power range monitors supplied by the same power supply system, selecting or generating a selected value from three core flow rate signals, of 12 core flow rate signals, which are sent from said same flow rate signal converter, so as to obtain four core flow rate signals corresponding to said respective flow rate signal converters, and then selecting or generating a selected value from the four core flow rate signals.

4. A system according to claim 3, wherein each of said rod block monitors comprises means for selecting a second smallest average reactor power signal as a selected signal from among three average reactor power signals supplied by the same power supply system, which are generated by average power range monitors operating normally, selecting a second largest core flow rate signal as a selected signal from among three core flow rate signals from said same flow rate signal converter, which are generated from average power range monitors operating normally, and selecting a smaller core flow rate signal as a selected signal from core flow rate signals which are left after withdrawing maximum and minimum values from among four core flow rate signals selected in correspondence with said flow rate signal converters, which are generated from flow rate signal converters operating normally.

5. A system according to claim 2, wherein each of said average power range monitors comprises means for selecting a smaller core flow rate signal of two core flow rate signals obtained from four recirculation differential pressure signals, monitoring the selected core flow rate signal together with a thermal output signal obtained by performing first order lag processing for an average reactor power signal, and generating an alarm signal indicating that a reactor power is in an unstable range upon detection of a low core flow rate, a high thermal output, or both a low core flow rate and a high thermal output, and performing a logic operation for the alarm signal in each of the power supply systems, and outputting the resultant signal.

6. A system according to claim 4, wherein each of said rod block monitors comprises means for using a core flow rate signal selected as a selected signal from the four core flow rate signals and an average reactor power signal selected as an optimal value from the three average reactor power signals to monitor the core flow rate signal together with a thermal output signal obtained by performing first order lag processing for the average reactor power signal, and determining that a reactor power is in an unstable range upon detection of a low core flow rate, a high thermal output, or both a low core flow rate and a high thermal output.

7. A system according to claim 3, wherein each of said rod block monitors comprises means for obtaining four core flow rate signals corresponding to said respective flow rate signal converters, and generating an abnormality signal when a maximum deviation between core flow rate signals, of the four core flow rate signals, which are generated from flow rate signal converters operating normally becomes larger than a predetermined value.

8. A system according to claim 1, wherein said flow rate signal converter, said average power range monitors, and said rod block monitors respectively comprise two flow rate signal converters, six average power range monitors, and two rod block monitors, each of said flow rate signal converters comprises means for receiving two recirculation differential pressure signals, converting the signals into digital signals, multiplexing the signals into a serial signal, and transmitting the serial signal to three of said average power range monitors, each of said average power range monitors comprises means for receiving two recirculation rate signals from one flow rate signal converter, obtaining one core flow rate signal by performing extraction of the recirculation signals and calculating an average power range value, using the core flow rate signal for monitoring an internal average power range signal, and transmitting the core flow rate signal to said two rod block monitors, together with each local power and an average reactor block, and each of said rod block monitors comprises means for receiving six average reactor power values from said six average power range monitors and six core flow rate signals, selecting or generating a selected value from three output signals from average power range monitors receiving power from the same power supply system, and further performing small value selection with respect to the core flow rate signals.

9. A system according to claim 8, wherein each of said rod block monitors comprises means for using a core flow rate signal and an average reactor power value selected as a selected value to monitor the core flow rate signal together with a thermal output signal obtained by performing first order lag processing for the average reactor power value, and determining that a reactor power is in an unstable range upon detection of a low core flow rate, a high thermal output, or both a low core flow rate and a high thermal output.

10. A power range monitor system for a nuclear reactor, comprising:

a plurality of average power range monitors for receiving neutron detection signals in the reactor and detection signals of recirculation flow values in the reactor, and calculating/monitoring a local power value at each part of the reactor, an average nuclear reactor power value, and a core flow rate value;

a plurality of rod block monitors for monitoring an average power range of local power values, of the plurality of local power values, which are obtained around a rod during a withdrawing operation, by comparing the average reactor power value and the core flow rate value;

digital transmission means for coupling flow rate signal converters and said average power range monitors to each other, and performing digital transmission of recirculation rate detection signals to be supplied from the flow rate signal converters to said average power range monitors;

means, provided for each of said average power range monitors, for performing extraction and average value processing for the recirculation rate detection signals transmitted by said digital transmission means; and selection/comparison means, provided for each of said rod block monitors, for selecting a selected value from a plurality of core flow rate signals, and comparing the plurality of core flow rate signals with each other.

11. A system according to claim 10, wherein said digital transmission means comprises at least one of a parallel optical transmission device and a serial optical transmission device.

12. A system according to claim 10, wherein said rod block monitors comprise one-of-three selecting sections for selecting a second largest signal of a plurality of input core flow rate values to determine a true core flow rate value obtained from a set of recirculation rate differential pressure signals.

13. A system according to claim 12, wherein each of said rod block monitors comprises a one-of-four selecting section for selecting a smaller value of values which are left after maximum and minimum values are withdrawn from a plurality of core flow rate values determined by said one-of-three selecting sections.

14. A system according to claim 12, wherein each of said rod block monitors comprises a one-of-three selecting section for selecting a second smallest average reactor power value of a plurality of average reactor power values from said average power range monitors.

* * * * *